(12) United States Patent
Nishino et al.

(10) Patent No.: US 8,976,486 B2
(45) Date of Patent: Mar. 10, 2015

(54) ROTATING DEVICE WITH HUB AND YOKE HAVING RADIAL EXTENSION PORTION

(71) Applicant: Samsung Electro-Mechanics Japan Advanced Technology Co., Ltd., Shizuoka (JP)

(72) Inventors: Hirotake Nishino, Shizuoka (JP); Akira Suzuki, Shizuoka (JP); Kazuyoshi Nagai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/053,258

(22) Filed: Oct. 14, 2013

(65) Prior Publication Data

US 2014/0111885 A1 Apr. 24, 2014

(30) Foreign Application Priority Data

Oct. 18, 2012 (JP) ................................. 2012-230791

(51) Int. Cl.
*G11B 17/02* (2006.01)
*G11B 17/028* (2006.01)
*G11B 19/20* (2006.01)

(52) U.S. Cl.
CPC ........ *G11B 17/0287* (2013.01); *G11B 19/2009* (2013.01)
USPC ...................................... 360/99.08

(58) Field of Classification Search
USPC ................................. 360/98.07, 99.04, 99.08
See application file for complete search history.

(56) References Cited

U.S. PATENT DOCUMENTS

RE38,601 E * 9/2004 Elsasser et al. ............ 360/98.07
2012/0250183 A1 * 10/2012 Tamaoka et al. ........... 360/99.08

FOREIGN PATENT DOCUMENTS

JP 2011-103150 A 5/2011

* cited by examiner

*Primary Examiner* — Joseph Feild
*Assistant Examiner* — Gustavo Polo
(74) *Attorney, Agent, or Firm* — Blank Rome LLP

(57) ABSTRACT

A rotating device is provided with: a hub that is rotatably supported by the base and on which a recording disk is to be mounted; a yoke that is fixedly provided on the hub and is configured to hold a magnet; a bearing unit in which one end thereof is fixedly provided on the base and in which the other end thereof is configured to hold the hub; and a coil that is fixedly provided on the base and is configured to generate electromagnetic interaction with the magnet. The hub has a screw hole in which a screw for fixing a clamper, which is used to fix the recording disk to the hub, to the hub is screwed. The screw hole penetrates the hub. The yoke is configured such that the yoke covers one end of the screw hole.

20 Claims, 9 Drawing Sheets

200

500

US 8,976,486 B2

ROTATING DEVICE WITH HUB AND YOKE HAVING RADIAL EXTENSION PORTION

REFERENCE TO RELATED APPLICATION

The present application claims benefit to Japanese Patent Application No. 2012-230791, filed Oct. 18, 2012, whose disclosure is hereby incorporated by reference in its entirety into the present disclosure.

BACKGROUND OF THE INVENTION

1. Field of the Invention

The present invention relates to a rotating device for rotationally driving a recording disk.

2. Description of the Related Art

An example of a rotating device includes a disk drive device such as a hard disk drive. Currently, devices have been developed to be small in size and large in capacity, and a 2.5 inch model with about 2.0 TB and a 3.5 inch model with about 4.0 TB have been introduced. With this trend, disk drive devices, which are conventionally mounted mainly in desktop PCs, have begun to be installed in various types of electronic devices such as laptop PCs and recording devices.

In a disk drive device, a recording disk is generally fixed to a hub using a clamper. The clamper is pressed against the hub by clamp screws, which are screwed in clamp screw holes provided in the hub. The clamper also presses the disk against the hub. Japanese Patent Application (Laid-Open) No. 2011-103150 suggests such a disk drive device.

SUMMARY OF THE INVENTION

In general, a clamp screw hole is formed as a non-through hole. Compared to a through hole, a non-through hole is difficult to form, and it is hard to remove extraneous materials accumulated inside the non-through hole. In other words, the existence of a non-through hole can hinder an improvement in productivity. On the other hand, a clamp screw hole formed as a through hole allows the disk side and the base side to communicate with each other via the screw hole. In that case, a lubricant that is vaporized can flow toward the disk through the screw hole and attach to the disk as an extraneous material. An extraneous material attached to the disk can cause read/write errors.

Such problems can occur in not just disk drive devices but also in rotating devices of other types.

In this background, a purpose of the present invention is to provide rotating devices that can prevent an increase in read/write errors while improving productivity.

A rotating device according to one embodiment of the present invention comprises: a base; a hub that is rotatably supported by the base and on which a recording disk is to be mounted; a yoke that is fixedly provided on the hub and is configured to hold a magnet; a bearing unit in which one end thereof is fixedly provided on the base and in which the other end thereof is configured to hold the hub; and a coil that is fixedly provided on the base and is configured to generate electromagnetic interaction with the magnet. The hub has a screw hole in which a screw for fixing a clamper, which is used to fix the recording disk to the hub, to the hub is screwed. The screw hole penetrates the hub, and the yoke is configured such that the yoke covers one end of the screw hole.

Another embodiment of the present invention also relates to a rotating device. The rotating device comprises: a base; a hub that is rotatably supported with respect to the base and on which a recording disk is to be mounted; a bearing unit in which one end thereof is fixedly supported by the base and in which the other end thereof is configured to hold the hub; a yoke that is fixedly supported by the hub and is configured to hold a magnet; and a coil that is fixedly supported by the base and is configured to generate electromagnetic interaction with the magnet. A projection area of the yoke in the axial direction covers a projection area of the coil in the axial direction.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1A:
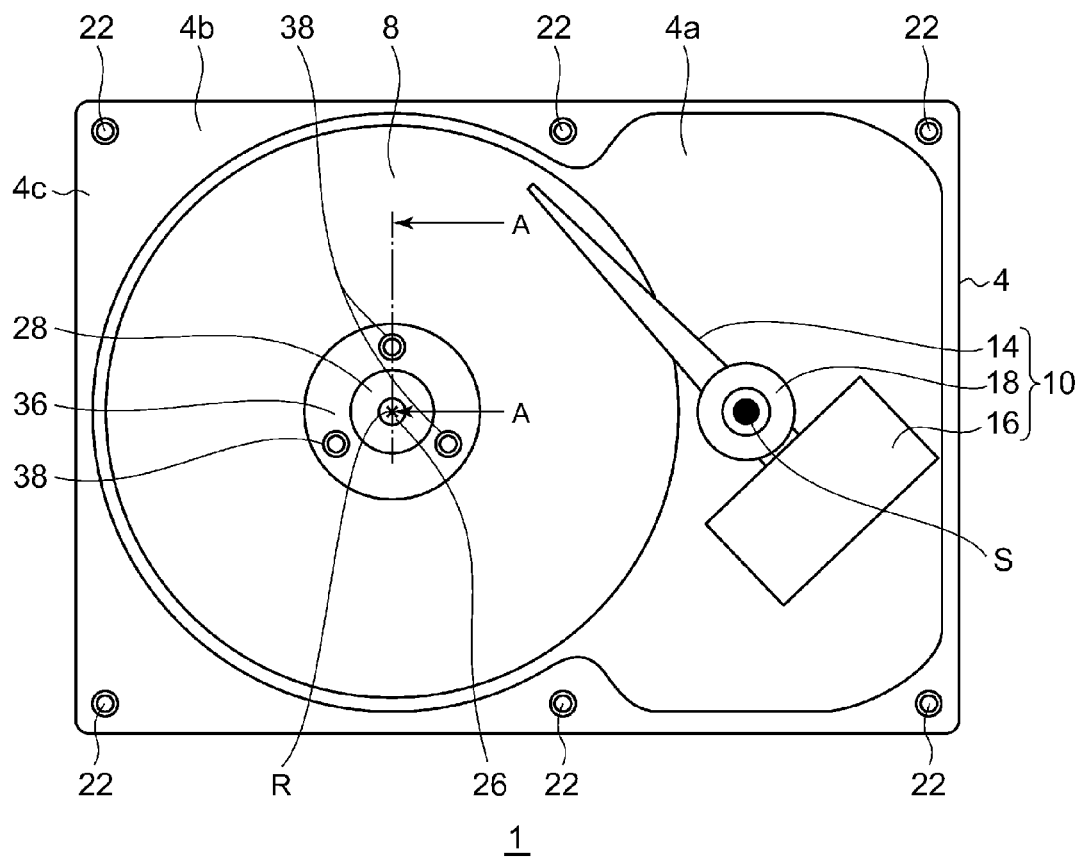
FIGS. 1A and 1B are a top view and a side view, respectively, of a rotating device according to a first embodiment.

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

The same or equivalent constituting elements, members, and steps illustrated in each drawing shall be denoted by the same reference numerals, and duplicative explanations will be omitted appropriately. The dimensions of members illustrated in each drawing are appropriately enlarged or reduced for easier understanding. Some of the components in each figure may be omitted if they are not important for explanation.

A rotating device according to an embodiment is preferably used as a disk drive device and particularly as a hard disk drive that is provided with a recording disk and that rotationally drives the recording disk.

First Embodiment

An overview of a rotating device according to the present embodiment is as shown below.

In the rotating device according to the present embodiment, a clamp screw hole for fixing a clamper, which is used to fix a recording disk to a hub, to the hub is formed in the hub. The clamp screw hole is formed as a through hole. Therefore, it becomes easy to form the clamp screw hole. Also, in the rotating device according to the present embodiment, a yoke is provided such that the yoke covers the base-side end portion of the clamp screw hole. Therefore, the amount of a vaporized lubricant flowing toward the recording disk through the clamp screw hole can be suppressed.

Figure 1B:

FIGS. 1A and 1B show a rotating device 1 according to the first embodiment. FIG. 1A is a top view of the rotating device 1. FIG. 1A shows the rotating device 1 without a top cover 2 in order to show the internal configuration of the rotating device 1. FIG. 1B is a side view of the rotating device 1.

The rotating device 1 comprises: a shaft 26, a hub 28, a clamper 36, clamp screws 38, a recording disk 8, a data read/write unit 10, a base 4, a top cover 2, and six screws 20.

Hereinafter, it is assumed that the side of the base 4 on which the hub 28 is installed is the "upper" side.

The recording disk 8 is a 3.5-inch type aluminum recording disk having a diameter of about 95 mm. The diameter of the central hole of the recording disk 8 is about 25 mm and the thickness of the disk 8 is about 1.27 mm or about 1.75 mm. The recording disk 8 is placed on the hub 28 and rotates with rotation of the hub 28.

The clamper 36 is pressed against the upper surface of the hub 28 by the clamp screws 38, and the clamper 36 presses the recording disk 8 against the disk-mount surface of the hub 28.

The base 4 is produced by die-casting an alloy of aluminum. The base 4 includes a bottom plate 4a forming the bottom portion of the rotating device 1, and an outer circumferential wall portion 4b formed along the outer circumference of the bottom plate 4a so that the outer circumferential wall portion 4b surrounds an installation region of the recording disk 8. Six screw holes 22 are formed on the upper surface 4c of the outer circumferential wall portion 4b.

The data read/write unit 10 includes a read/write head (not shown), a swing arm 14, a voice coil motor 16, and a pivot assembly 18. The read/write head is attached to the tip of the swing arm 14. The read/write head records data onto and reads data from the recording disk 8. The pivot assembly 18 swingably supports the swing arm 14 with respect to the base 4 around a head rotation axis S. The voice coil motor 16 swings the swing arm 14 around the head rotation axis S and moves the read/write head to the desired position on the upper surface of the recording disk 8. The voice coil motor 16 and the pivot assembly 18 are constructed using a known technique for controlling the position of the head.

The shaft 26 extends along a rotational axis R. The upper end of the shaft 26 is fixed to the hub 28 in such a manner described below.

The top cover 2 is fixed onto the upper surface 4c of the outer circumferential wall portion 4b of the base 4 using six screws 20. The six screws 20 correspond to the six screw holes 22, respectively. In particular, the top cover 2 and the upper surface 4c of the outer circumferential wall portion 4b are fixed together so that the joint portion between both does not create a leak into the inside of the rotating device 1.

Figure 2:
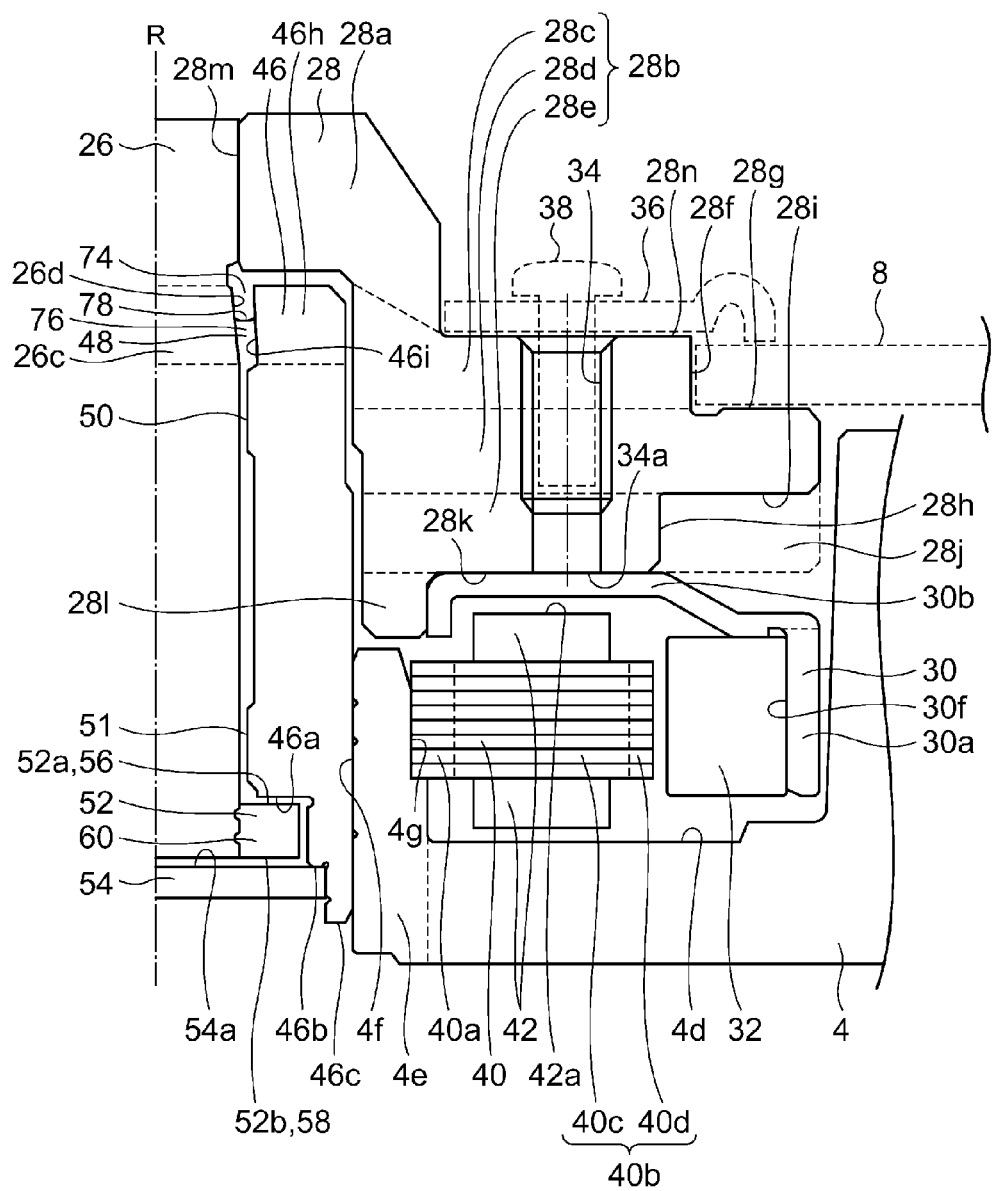
FIG. 2 is a section view sectioned along line A-A in FIG. 1A.

FIG. 2 is a section view sectioned along line A-A in FIG. 1A.

The rotating device 1 further comprises a cylindrical magnet 32, a yoke 30, a flange 52, a laminated core 40, a coil 42, a sleeve 46, a plate 54, and a lubricant 48.

The hub 28 is made of soft-magnetic steel such as SUS430F or aluminum. The hub 28 is formed to have a predetermined cup-like shape by, for example, the press working or cutting of a steel plate. For example, the hub 28 may preferably be made of a stainless steel (product name: DHS1) provided by Daido Steel Co., Ltd., since the stainless steel has lower outgas and is easily worked. The hub 28 may more preferably be made of a stainless steel (product name: DHS2) provided by Daido Steel Co., Ltd., since the stainless steel has high corrosion resistance.

The hub 28 has a surrounding portion 28a that surrounds the shaft 26, a cylindrical portion 28b that is provided outward in the radial direction (i.e. in a direction perpendicular to a rotational axis R) from a lower end of the surrounding portion 28a and that surrounds the sleeve 46, and a hub protruding portion 28l that protrudes downward from a lower surface 28k of the cylindrical portion 28b and that surrounds the sleeve 46. The cylindrical portion 28b has a middle diameter portion 28c on the upper side and has a large diameter portion 28d formed below the middle diameter portion 28c such that the diameter of the large diameter portion 28d is larger than that of the middle diameter portion 28c. The cylindrical portion 28b further has a small diameter portion 28e formed below the large diameter portion 28d such that the diameter of the small diameter portion 28e is smaller than that of the middle diameter portion 28c. The magnitude relationship between the diameter of the middle diameter portion 28c and the diameter of the small diameter portion 28e may be reversed.

A central hole of the recording disk 8 fits to the outer circumferential surface 28f of the middle diameter portion 28c, and the recording disk 8 is placed on a disk-mount surface 28g, which is the upper surface of the large diameter portion 28d.

The outer circumferential surface 28h of the small diameter portion 28e and the lower surface 28i of the large diameter portion 28d form a thickness reduction portion 28j recessed inward in the radial direction from the lower outer edge of the cylindrical portion 28b. An inner surface of the thickness reduction portion 28j in the radial direction is the outer circumferential surface 28h of the small diameter portion 28e. Thus, the inner surface is located closer to the rotational axis R compared to the outer circumferential surface 28f of the middle diameter portion 28c to which the central hole of the recording disk 8 fits.

Three clamp screw holes 34 are provided in the cylindrical portion 28b around the rotational axis R at intervals of 120 degrees. The clamp screw holes 34 are provided such that the clamp screw holes 34 penetrate the cylindrical portion 28b in the axial direction, i.e., a direction parallel to the rotational axis R. The clamper 36 is pressed against the upper surface 28n of the cylindrical portion 28b of the hub 28 by the three clamp screws 38, which are screwed in the three clamp screw holes 34. The clamper 36 presses the recording disk 8 against the disk-mount surface 28g of the hub 28.

The yoke 30 is formed by the press working of a plate of a magnetic material such as iron. Therefore, the yoke 30 has an embossed surface. The yoke 30 having "an embossed surface" means that a concave-convex pattern according to a press surface of a press mold is formed on the surface of the yoke 30. The yoke 30 is formed such that the thickness thereof is in a range of 0.2 mm to 1.0 mm. The yoke 30 has a cylindrical magnet holding portion 30a and a cover portion 30b extending inward in the radial direction from the upper end of the magnet holding portion 30a. The cover portion 30b is formed such that the cover portion 30b covers respective end portions 34a of the clamp screw holes 34 on the side of the base 4. Also, the cover portion 30b is formed such that a projection area of the cover portion 30b in the axial direction covers a projection area of the coil 42 in the axial direction. The projection area in the axial direction means an area that is included when projected in the axial direction. In other words, the cover portion 30b is formed such that the cover portion 30b faces the entire upper end 42a of the coil 42 in the axial direction. The cover portion 30b is glued on the lower surface 28k of the small diameter portion 28e of the hub 28. The cover portion 30b may be fixed, by press-fitting, gluing, or by a combination of press-fitting and gluing, to the hub protruding portion 28l. The cover portion 30b may be fixed to both the lower surface 28k of the small diameter portion 28e and the hub protruding portion 28l.

The cylindrical magnet 32 is glued on the inner circumferential surface 30f of the magnet holding portion 30a of the yoke 30. The cylindrical magnet 32 is formed of, e.g., a rare earth magnet material or a ferrite magnet material. In the present embodiment, the cylindrical magnet 32 is formed of a ferrite magnet material. The cylindrical magnet 32 is magnetized for driving, with eight poles in the circumferential direction (i.e. in a tangential direction of a circle the center of which is in the rotational axis R, the circle being perpendicular to the rotational axis R). A surface layer formation process with electrodeposition coating, spray coating, or the like is performed on the surface of the cylindrical magnet 32, and, for example, rusting is prevented. The cylindrical magnet 32 faces twelve teeth of the laminated core 40 in the radial direction.

The laminated core 40 has a ring portion 40a and twelve teeth 40b, which extend outward in the radial direction from the ring portion 40a, and is fixed on the side of the upper surface 4d of the base 4. The laminated core 40 is formed by laminating eight thin magnetic steel sheets and mechanically integrating them. An insulation coating is applied onto the surface of the laminated core 40 by electrodeposition coating or powder coating. Each of the twelve teeth 40b has an intermediate portion 40c extending outward in the radial direction from the ring portion 40a and a tip portion 40d provided on the side of the intermediate portion 40c opposite to the ring portion 40a. The coil 42 is wound around each intermediate portion 40c. A driving flux is generated along the teeth by applying a three-phase sinusoidal driving current through the coil 42.

Figure 3B:
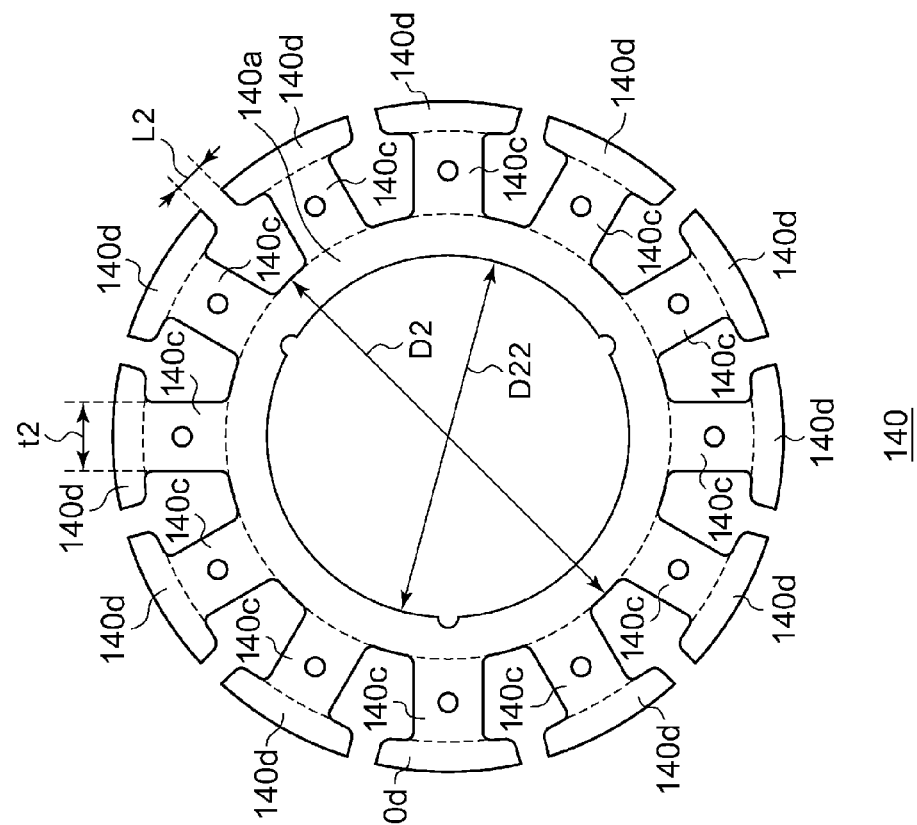
FIGS. 3A and 3B are top views of laminated cores.
Figure 3A:
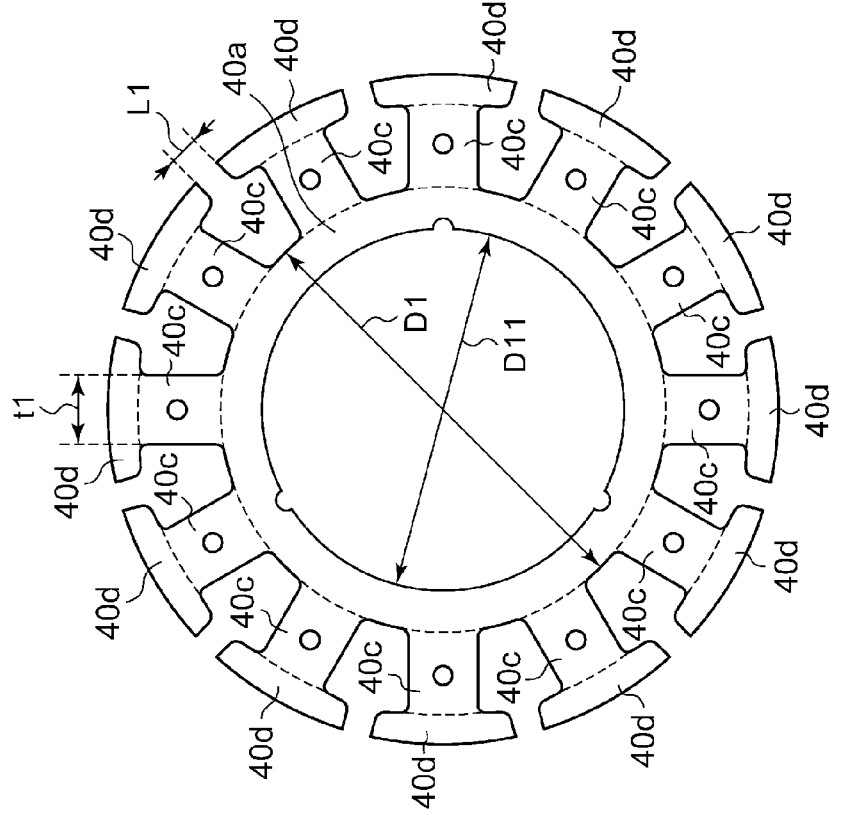

FIGS. 3A and 3B are top views of laminated cores. FIG. 3A shows the laminated core 40 according to the present embodiment, and FIG. 3B shows a laminated core 140 according to a comparative example. In the laminated core 140 according to a comparative example, the outer diameter D2 and the inner diameter D22 of a ring portion 140a, the thickness t2 of an intermediate portion 140c in the circumferential direction, and a distance L2 between adjacent tip portions 140d satisfy the following relationships.

$0.835 < D22/D2 < 0.841$
$0.127 < t2/D2 < 0.133$
$0.052 < L2/D2 < 0.056$

On the other hand, the laminated core 40 according to the present embodiment is formed such that the outer diameter D1 and the inner diameter D11 of the ring portion 40a, the thickness t1 of the intermediate portion 40c in the circumferential direction, and a distance L1 between adjacent tip portions 40d satisfy the following relationships.

$0.811 < D11/D1 < 0.817$
$0.151 < t1/D1 < 0.157$
$0.063 < L1/D1 < 0.067$

In other words, the laminated core 40 is formed such that the thickness of the ring portion 40a in the radial direction, the thickness t1 of the intermediate portion 40c in the circumferential direction with respect to the outer diameter D1 of the ring portion 40a, and the distance L1 between adjacent tip portions 40d with respect to the outer diameter D1 of the ring portion 40a are larger than those of the laminated core 140.

Referring back to FIG. 2, the base 4 includes a cylindrical base protruding portion 4e, the center of which is along the rotational axis R. The base protruding portion 4e protrudes toward the hub 28 such that the base protruding portion 4e surrounds the sleeve 46. The laminated core 40 is fitted to the outer surface 4g of the base protruding portion 4e with a press-fit or clearance fit and glued thereon.

The shaft 26, the flange 52, the sleeve 46, the plate 54, and the lubricant 48 are attached to the base 4 so as to form a bearing unit, which rotatably supports the hub 28. The upper end of the shaft 26 is fixed to a hole 28m, which is provided at the center of the hub 28 and is provided coaxially with the rotational axis R of the hub 28, by a combination of press-fitting and gluing. The flange 52 is press-fitted to the lower end of the shaft 26.

The sleeve 46 is a ring-shaped member and is fixed with glue in a through hole 4f, which is provided at the inner circumferential surface of the base protruding portion 4e, i.e., is provided in the base 4 and the center of which is along the rotational axis R. The sleeve 46 accommodates the shaft 26. The sleeve 46 has three lower surfaces: an inner lower surface 46a; an intermediate lower surface 46b; and an outer lower surface 46c. The lower surfaces are arranged in said order from the inside in the radial direction. The intermediate lower surface 46b is located below the inner lower surface 46a, and the outer lower surface 46c is located below the intermediate lower surface 46b.

The sleeve 46 has a sleeve taper portion 46h at the upper end thereof. The shaft 26 has a shaft taper portion 26c facing the sleeve taper portion 46h. The sleeve taper portion 46h surrounds the shaft taper portion 26c. A taper seal 76, where a gap 74 between the inner circumferential surface 46i of the sleeve taper portion 46h and the outer circumferential surface 26d of the shaft taper portion 26c gradually increases upward, is formed between the sleeve taper portion 46h and the shaft taper portion 26c. In particular, the inner circumferential surface 46i of the sleeve taper portion 46h is formed such that the upper a position in the inner circumferential surface 46i becomes, the less the diameter of the inner circumferential surface 46i becomes, and the outer circumferential surface 26d of the shaft taper portion 26c is formed such that the upper a position in the outer circumferential surface 26d becomes, the less the diameter of the outer circumferential surface 26d becomes. The rate of decrease in the diameter of the inner circumferential surface 46i of the sleeve taper portion 46h is less than the rate of the decrease in the diameter of the outer circumferential surface 26d of the shaft taper portion 26c. These conditions realize the taper shape of the taper seal 76. During the rotation of the shaft 26, a force directed outward in the radial direction due to a centrifugal force is applied to the lubricant 48 in the taper seal 76. The inner circumferential surface 46i of the sleeve taper portion 46h is formed such that the upper a position in the inner circumferential surface 46i becomes, the less the diameter of the inner circumferential surface 46i becomes. Thus, the force acts to suck in the lubricant 48. The taper seal 76 has a gas-liquid interface 78 of the lubricant 48 and suppresses the leakage of the lubricant 48 by way of the capillary effect.

The plate 54 is fixed with glue to the intermediate lower surface 46b of the sleeve 46 such that the plate 54 seals the lower end portion of the sleeve 46. A flange space 60 that can accommodate the flange 52 is formed between the upper surface 54a of the plate 54 and the inner lower surface 46a of the sleeve 46.

A space between a set of the shaft 26 and the flange 52 and a set of the sleeve 46 and the plate 54 is filled with the lubricant 48.

A first radial dynamic pressure groove 50 and a second radial dynamic pressure groove 51, which are vertically spaced apart from each other and are herringbone-shaped, are formed on the inner circumferential surface of the sleeve 46. A first herringbone-shaped thrust dynamic pressure groove 56 is formed on the upper surface 52a of the flange 52, and a second herringbone-shaped thrust dynamic pressure groove 58 is formed on the lower surface 52b of the flange 52. During the rotation of the hub 28, the hub 28 is radially and axially supported by the dynamic pressure generated in the lubricant 48 by these dynamic pressure grooves. Any one of the first radial dynamic pressure groove 50, the second radial dynamic pressure groove 51, the first thrust dynamic pressure groove 56, and the second thrust dynamic pressure groove 58 may be shaped into a spiral shape.

At least one of the first radial dynamic pressure groove 50 and the second radial dynamic pressure groove 51 may be formed on the shaft 26. Also, the first thrust dynamic pressure groove 56 may be formed on the inner lower surface 46a of the sleeve 46, and the second thrust dynamic pressure groove 58 may be provided on the upper surface 54a of the plate 54.

An explanation is given of the operation of the rotating device 1 formed as described above. A three-phase driving current is supplied to the coil 42 to rotate the recording disk 8. A flux is generated along the twelve teeth when the driving current flows through the coil 42. This flux provides torque to the cylindrical magnet 32, allowing the hub 28 and the recording disk 8 fitted to the hub 28 to rotate. Along with this, the voice coil motor 16 swings the swing arm 14, and the read/write head goes back and forth within a swing range on the recording disk 8. The read/write head converts magnetic data recorded on the recording disk 8 to an electrical signal and transmits the electrical signal to a control board (not shown). The read/write head also converts data sent from the control board in the form of an electrical signal to magnetic data and writes the magnetic data on the recording disk 8.

According to the rotating device 1 of the present embodiment, the clamp screw holes 34 are formed such that the clamp screw holes 34 penetrate the hub 28. Therefore, the clamp screw holes 34 can be easily formed. Extraneous materials accumulated inside the clamp screw holes 34 during the forming or the like can be easily removed. The cover portion 30b of the yoke 30 covers the respective end portions 34a of the clamp screw holes 34 on the side of the base. Therefore, the amount of the lubricant 48 that flows toward the recording disk 8 through the clamp screw holes 34 and that can attach to the recording disk 8 as an extraneous material can be suppressed. In other words, while improving productivity by forming the clamp screw holes 34 to be through holes, an increase in read/write errors caused by the clamp screw holes 34, which are formed to be through holes, can be prevented.

According to the rotating device 1 according to the present embodiment, the laminated core 40 is formed such that the thickness of the ring portion 40a in the radial direction, the thickness t2 of the intermediate portion 40c in the circumferential direction with respect to the outer diameter D1 of the ring portion 40a, and the distance L1 between adjacent tip portions 40d with respect to the outer diameter D1 of the ring portion 40a are larger than those of the laminated core 140 according to the comparative example. This allows mechanical vibration caused due to cogging torque to be prevented, and the noise of the rotating device 1 is reduced as a result.

In order to verify a noise reduction effect of the laminated core 40, the present inventors have carried out experiments using the rotating device 1 provided with the laminated core 40 according to the present embodiment and the rotating device 100 provided with the laminated core 140 according to the comparative example. The configuration of the laminated core 40 and the configuration of the laminated core 140 are as shown in the following:

<Laminated Core 40 According to Present Embodiment>
    outer diameter D1 of ring portion 40a: 18.45 mm
    inner diameter D11 of ring portion 40a: 15.02 mm
    thickness t1 of intermediate portion 40c in circumferential direction: 2.85 mm
    distance L1 between adjacent tip portions 40d: 1.2 mm <Laminated Core 140 According to Comparative Example>
    outer diameter D2 of ring portion 140a: 18.45 mm
    inner diameter D22 of ring portion 140a: 15.46 mm
    thickness t2 of intermediate portion 140c in circumferential direction: 2.4 mm
    distance L2 between adjacent tip portions 140d: 1 mm More specifically, each of the rotating device 1 provided with the laminated core 40 and the rotating device 100 provided with the laminated core 140 was rotated at a rotation frequency N=120 (Hz) (7200 (rpm)), and the noise thereof was collected. Then, a sound pressure level of a harmonic component of the least common multiple of the number (12) of the teeth of the laminated core 40 or the laminated core 140 and the number (8) of magnetic poles of the cylindrical magnet 32 was obtained. In other words, a sound pressure level of a 24th order harmonic component, which was a main component of cogging torque, was obtained.

Figure 4:
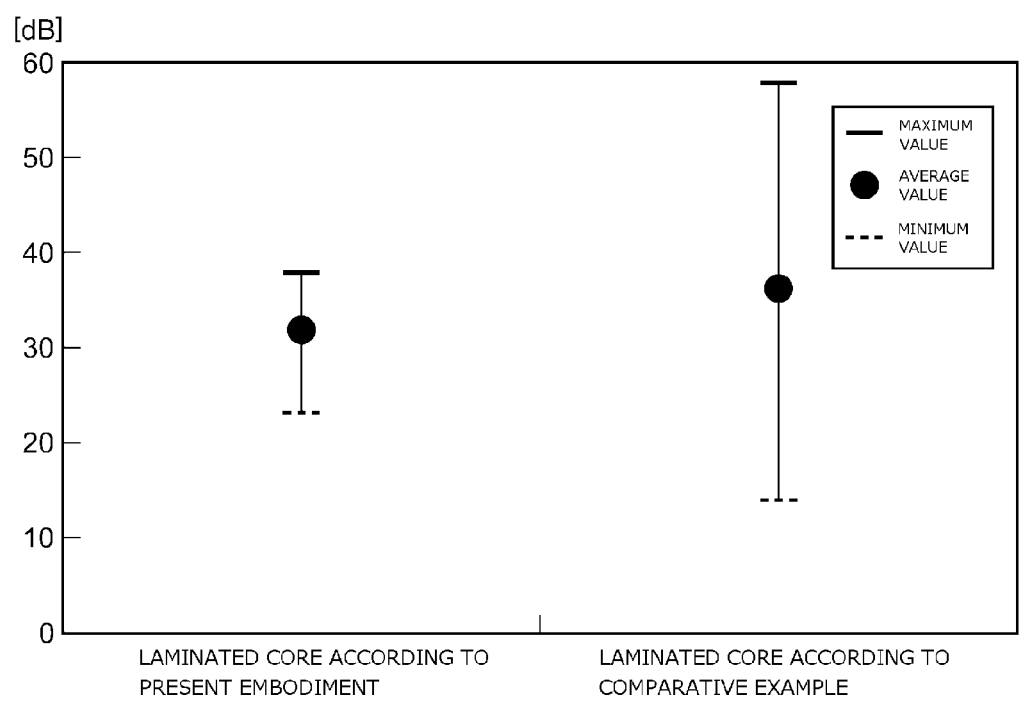
FIG. 4 shows a sound pressure level of a 24th order harmonic component of each rotating device.

FIG. 4 shows a sound pressure level of a 24th order harmonic component of each rotating device. The left side of FIG. 4 shows a sound pressure level of the rotating device 1 provided with the laminated core 40, and the right side of the figure shows a sound pressure level of the rotating device for which the laminated core 140 was used. According to the figure, it can be found that the average value of the sound pressure level of the rotating device 1 provided with the laminated core 40 is lower than that of the rotating device 100 provided with the laminated core 140 by a sound pressure level of about 5 dB. A difference between the maximum value and the minimum value of a sound pressure level is about 15 dB for the rotating device 1 and is about 45 dB for the rotating device 100. Thus, it can be found that a variation is small in the sound pressure level of the rotating device 1.

Second Embodiment

Main differences between the rotating device 1 according to the first embodiment and a rotating device 200 according to a second embodiment are the shape of a yoke and the shape of a hub.

Figure 5:
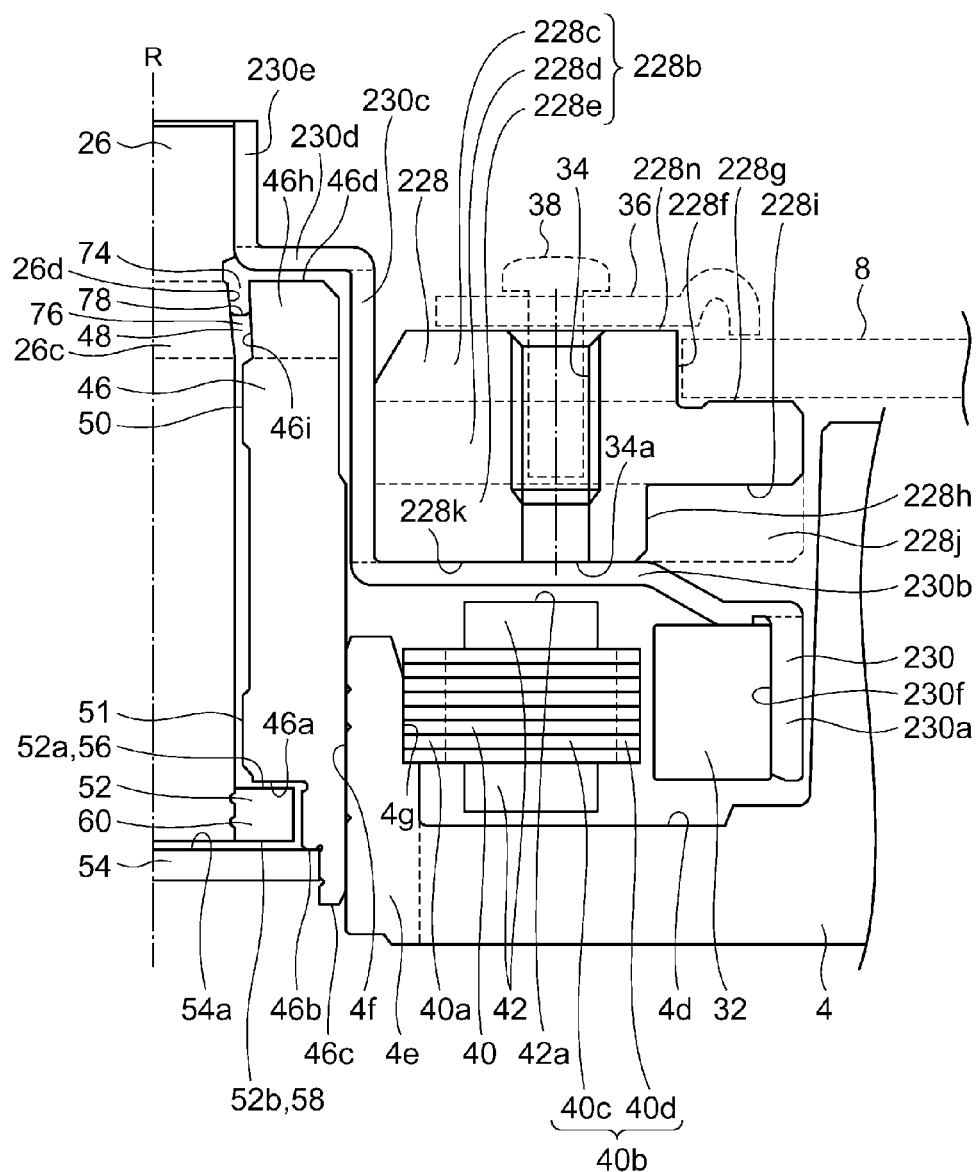
FIG. 5 is a section view of a rotating device according to a second embodiment.

FIG. 5 shows a section view of the rotating device 200 according to the second embodiment. FIG. 5 corresponds to FIG. 2.

A yoke 230 is formed by the press working of a magnetic material such as iron and is formed such that the thickness thereof is in a range of 0.2 mm to 1.0 mm. The yoke 230 has a shaft surrounding portion 230e that surrounds a shaft 26, a sleeve facing portion 230d that extends outward in the radial direction from the lower end of the shaft surrounding portion 230e and that faces the upper end 46d of a sleeve 46, a hub contacting portion 230c that extends downward from the sleeve facing portion 230d and that surrounds the sleeve 46, a cover portion 230b that extends outward in the radial direction from the lower end of the hub contacting portion 230c, and a magnet holding portion 230a that extends downward from the cover portion 230b. The upper end of the shaft 26 is fixed to the shaft surrounding portion 230e by a combination of press-fitting and gluing.

A hub 228 has a cylindrical portion 228b. The cylindrical portion 228b is fixed, by press-fitting, gluing, or by a combination of press-fitting and gluing, to the hub contacting portion 230c. In the present embodiment, the hub 228 is fixed to the shaft 26 via the yoke 230. Therefore, the hub 228 can be configured not to have a surrounding portion that surrounds the shaft 26.

In the rotating device 200 according to the present embodiment, operations and effects are achieved that are similar to those achieved by the rotating device 1 according to the first embodiment. In addition, in the rotating device 200 according to the present embodiment, the hub 228 can be configured not to have a surrounding portion that surrounds the shaft 26. This allows the volume of the hub 228 to be reduced by the amount of a surrounding portion, and material costs can thus be reduced. Also, without a surrounding portion, the hub 228 has an annular shape. In other words, in addition to having a reduced volume, the hub 228 has a relatively simple shape. Therefore, forming costs can be reduced particularly when the hub 228 is formed by cutting. By interposing the yoke 230 between the hub 228 and the shaft 26, the shape of the yoke 30 becomes relatively complicated. However, since the yoke 230 is formed by press working, the complexity of the shape thereof does not become an issue.

If the frequency of the torque-ripple coincides with that of the second rocking-mode resonance (hereinafter, referred to as "second rocking-mode resonance"), large vibration due to the resonance is generated in the rotating device 1. Increasing the frequency of the second rocking-mode resonance is known as a method for avoiding this coincidence of the frequencies. One of the factors determining the frequency of the second rocking-mode resonance is the transverse moment of inertia of the hub 28, and the frequency of the second rocking-mode resonance can be increased by reducing the transverse moment of inertia. The transverse moment of inertia of the hub 28 is determined by the mass of the hub 28. Thus, the frequency of the second rocking-mode resonance can be increased by reducing the mass of the hub 28. On the other hand, in the rotating device 200 according to the present embodiment, the hub 228 can be configured not to have a surrounding portion. Thus, the mass of the hub 228 can be reduced by the amount of the surrounding portion. Therefore, the frequency of the second rocking-mode resonance can be increased, thereby avoiding coincidence of the frequency of the torque-ripple and that of the second rocking-mode resonance.

Third Embodiment

A main difference between the rotating device 200 according to the second embodiment and a rotating device 300 according to a third embodiment is the shape of a yoke.

Figure 6:
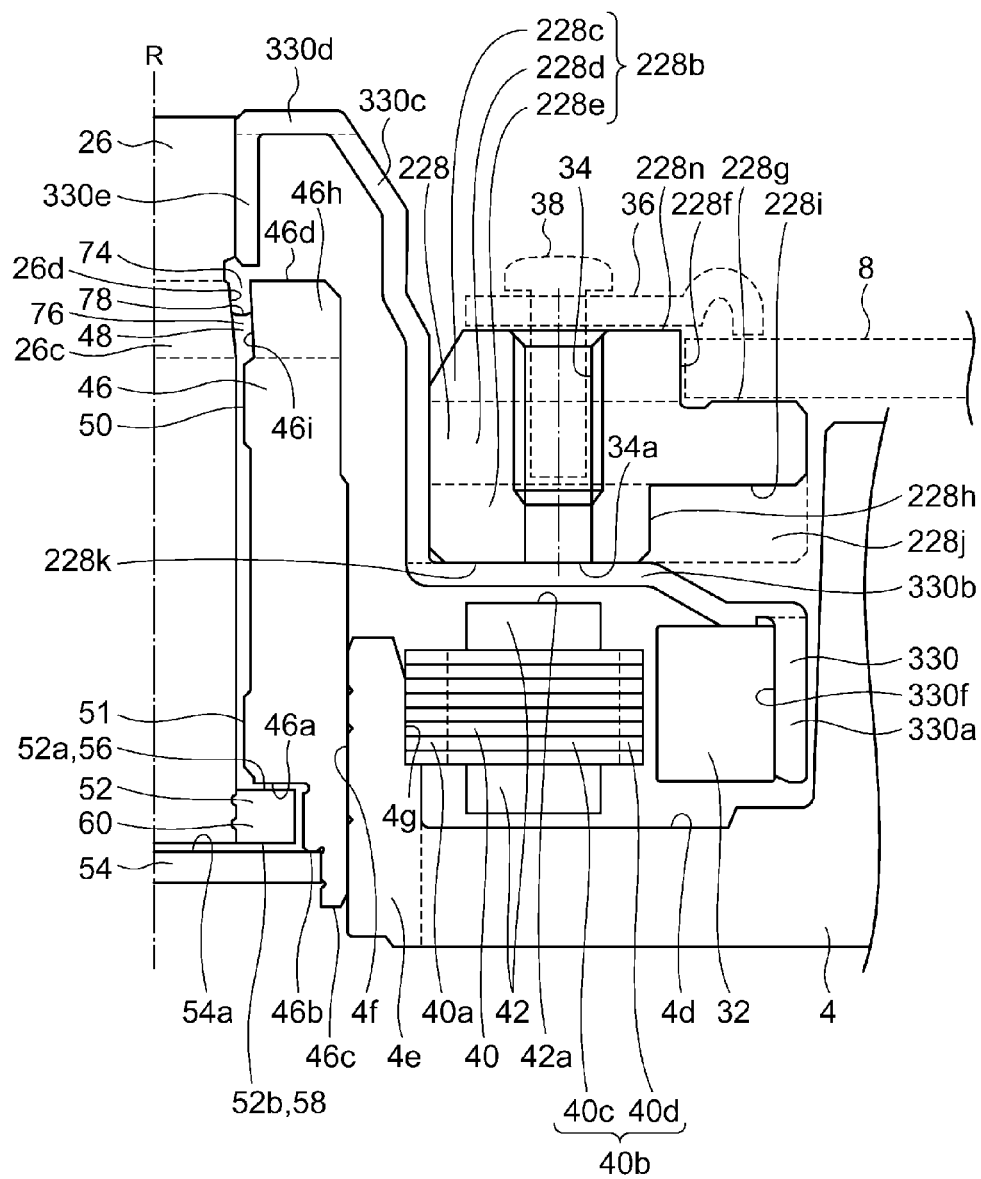
FIG. 6 is a section view of a rotating device according to a third embodiment.

FIG. 6 shows a section view of the rotating device 300 according to the third embodiment. FIG. 6 corresponds to FIG. 5.

A yoke 330 has a shaft surrounding portion 330e, a sleeve facing portion 330d, a hub contacting portion 330c, a cover portion 330b, and a magnet holding portion 330a. In the present embodiment, the sleeve facing portion 330d extends outward in the radial direction from the upper end of the shaft surrounding portion 330e.

In the rotating device 300 according to the present embodiment, operations and effects are achieved that are similar to those achieved by the rotating device 200 according to the second embodiment.

Fourth Embodiment

A main difference between the rotating device 1 according to the first embodiment and a rotating device 400 according to a fourth embodiment is the shape of a sleeve.

Figure 7:
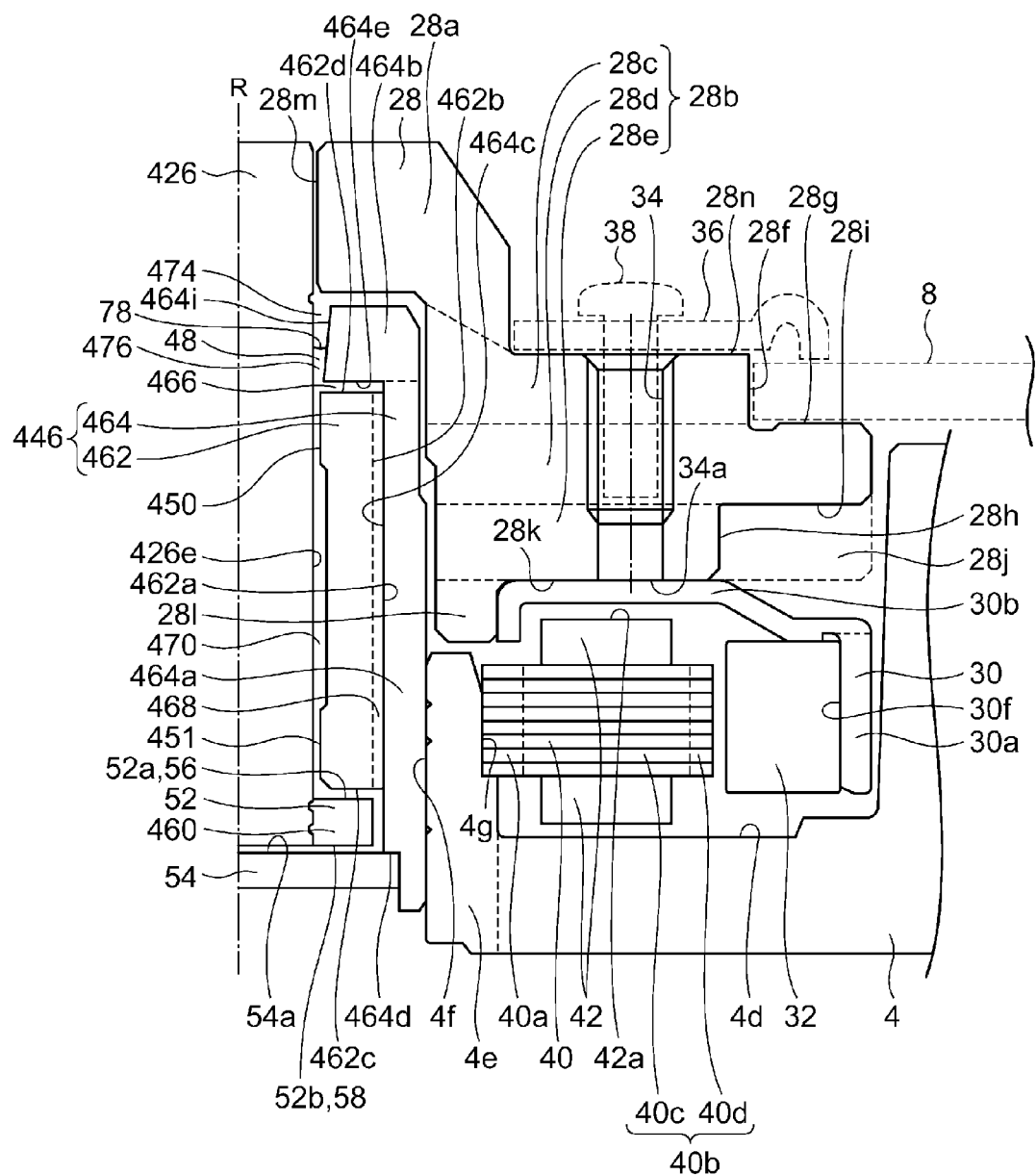
FIG. 7 is a section view of a rotating device according to a fourth embodiment.

FIG. 7 shows a section view of the rotating device 400 according to the fourth embodiment. FIG. 7 corresponds to FIG. 2.

A sleeve 446 has a first surrounding portion 462 and a second surrounding portion 464. The first surrounding portion 462 is a cylindrical member that surrounds the shaft 426. The second surrounding portion 464 is a member that surrounds the shaft 426 and the first surrounding portion 462 and has a reverse L-shaped cross section. A first radial dynamic pressure groove 450 and a second radial dynamic pressure groove 451, which are vertically spaced apart from each other and are herringbone-shaped, are formed on the inner circumferential surface of the first surrounding portion 462. Thus, relatively high dimensional accuracy is required for the first surrounding portion 462. Therefore, the first surrounding portion 462 is formed by cutting of a steel material.

The second surrounding portion 464 has a first annular portion 464a that surrounds the first surrounding portion 462 and a second annular portion 464b that is provided above the first annular portion 464a. The second surrounding portion 464 is formed of a predetermined resin material by, for example, metallic molding such as injection molding. The second surrounding portion 464 may be formed of a metallic material by, for example, metallic molding such as sinter molding. The second surrounding portion 464 may have a cutting surface by cutting at least a part thereof.

The first surrounding portion 462 is fixed inside the first annular portion 464a by, for example, gluing. The inner circumferential surface 464c of the first annular portion 464a and the outer circumferential surface 462a of the first surrounding portion 462 may partially have a press-fitted portion.

A disk-like pool space 466 is formed between the first surrounding portion 462 and the first annular portion 464a. More specifically, the pool space 466 is formed between the upper surface 462d of the first surrounding portion 462 and the lower surface 464e of the second annular portion 464b. A communication groove 462b (described later) has one end in the pool space 466.

A taper seal 476, where a gap 474 between the inner circumferential surface 464i of the second annular portion 464b and the outer circumferential surface 426e of the shaft 426 gradually increases upward, is formed between the second annular portion 464b and the shaft 426. In particular, the taper shape of the taper seal 476 is realized by forming the taper seal 476 such that the upper a position in the inner circumferential surface 464i of the second annular portion 464b becomes, the larger the diameter of the inner circumferential surface 464i becomes. In other words, different from the case in the first embodiment, a shaft taper portion is not formed in the shaft 426, and the taper shape of the taper seal 476 is realized only by the inclination of the inner circumferential surface 464i of the second annular portion 464b. As in the case of the first embodiment, a force that acts to suck in the lubricant 48 is applied to the lubricant 48 by this taper seal 476 during the rotation of the shaft 426. The taper seal 476 suppresses the leakage of the lubricant 48 by way of the capillary effect. The second annular portion 464b formed of a resin material may be impregnated with an oil repellent agent in order to further suppress the leakage of the lubricant 48.

The plate 54 is fixed with glue to the lower surface 464d of the first annular portion 464a such that the plate 54 seals the lower end portion of the second surrounding portion 464. The upper surface 54a of the plate 54, the lower surface 462c of the first surrounding portion 462, and the inner circumferential surface 464c of the first annular portion 464a form a flange space 460 that can accommodate the flange 52.

On the outer circumferential surface 462a of the first surrounding portion 462, a communication groove 462b, which is a concave portion penetrating the first surrounding portion 462 in the axial direction, is formed linearly. Therefore, in a condition where the first surrounding portion 462 is attached to the second surrounding portion 464, a communication hole 468 is formed by the communication groove 462b and the inner circumferential surface 464c of the first annular portion 464a of the second surrounding portion 464.

A space between a set of the shaft 426 and the flange 52 and a set of the first surrounding portion 462, the second surrounding portion 464, and the plate 54 is filled with the lubricant 48. The pool space 466 and the communication hole 468 are filled with the lubricant 48. In particular, the pool space 466 is fully filled with the lubricant 48. The pool space 466 functions as a lubricant reservoir for storing the lubricant 48.

Regarding a path of the lubricant 48, the upper end of a radial clearance 470 between the shaft 426 and the first surrounding portion 462 is adjacent to the pool space 466 and is connected to the pool space 466. The lower end of the radial clearance 470 is adjacent to a flange space 460 and is connected to the flange space 460. The pool space 466 and the flange space 460 are communicated with each other by the communication hole 468. Therefore, both ends of the radial clearance 470 in the axial direction are communicated with each other via the communication hole 468 formed separately from the radial clearance 470.

In the rotating device 400 according to the present embodiment, operations and effects are achieved that are similar to those achieved by the rotating device 1 according to the first embodiment. In addition, in the rotating device 400 according to the present embodiment, the sleeve 446 is formed by combining the first surrounding portion 462 and the second surrounding portion 464, which are formed separately. Therefore, only the first surrounding portion 462 for which relatively high dimensional accuracy is required can be formed by cutting, and the second surrounding portion 464 for which relatively high dimensional accuracy is not required can be formed by injection molding or sinter molding for which forming costs are relatively small. Since the first surrounding portion 462 has a cylindrical shape, which is a relatively simple shape, the cutting of the first surrounding portion 462 is relatively easy. In other words, the forming costs of the sleeve 446 can be reduced.

The sleeve 446 is formed by combining the first surrounding portion 462 and the second surrounding portion 464, which are formed separately. Thus, the communication hole 468 can be formed by a relatively easy forming of providing the communication groove 462b on the outer circumferential surface 642a of the first surrounding portion 462.

In the rotating device 400 according to the present embodiment, the both ends of the radial clearance 470 are communicated with each other via the communication hole 468 provided separately from the radial clearance 470. Therefore, the generation of an excessive difference in pressure can be prevented by averaging the pressure of the lubricant 48 at the both ends of the radial clearance 470. As a result, the stiffness of the bearing can be increased by increasing radial dynamic pressure at the time of rotation without being restricted by the generation of a difference in pressure.

In the rotating device 400 according to the present embodiment, since the shaft 426 does not have a shaft taper portion, the shaft 426 can be formed to have a straight shape (i.e. no step on the side surface). Therefore, it becomes easy to form the shaft 426, improving dimensional accuracy of the shaft 426.

Fifth Embodiment

Main differences between the rotating device 1 according to the first embodiment and a rotating device 500 according to a fifth embodiment are the shape of a shaft, the shape of a sleeve, and the presence of a plate.

Figure 8:
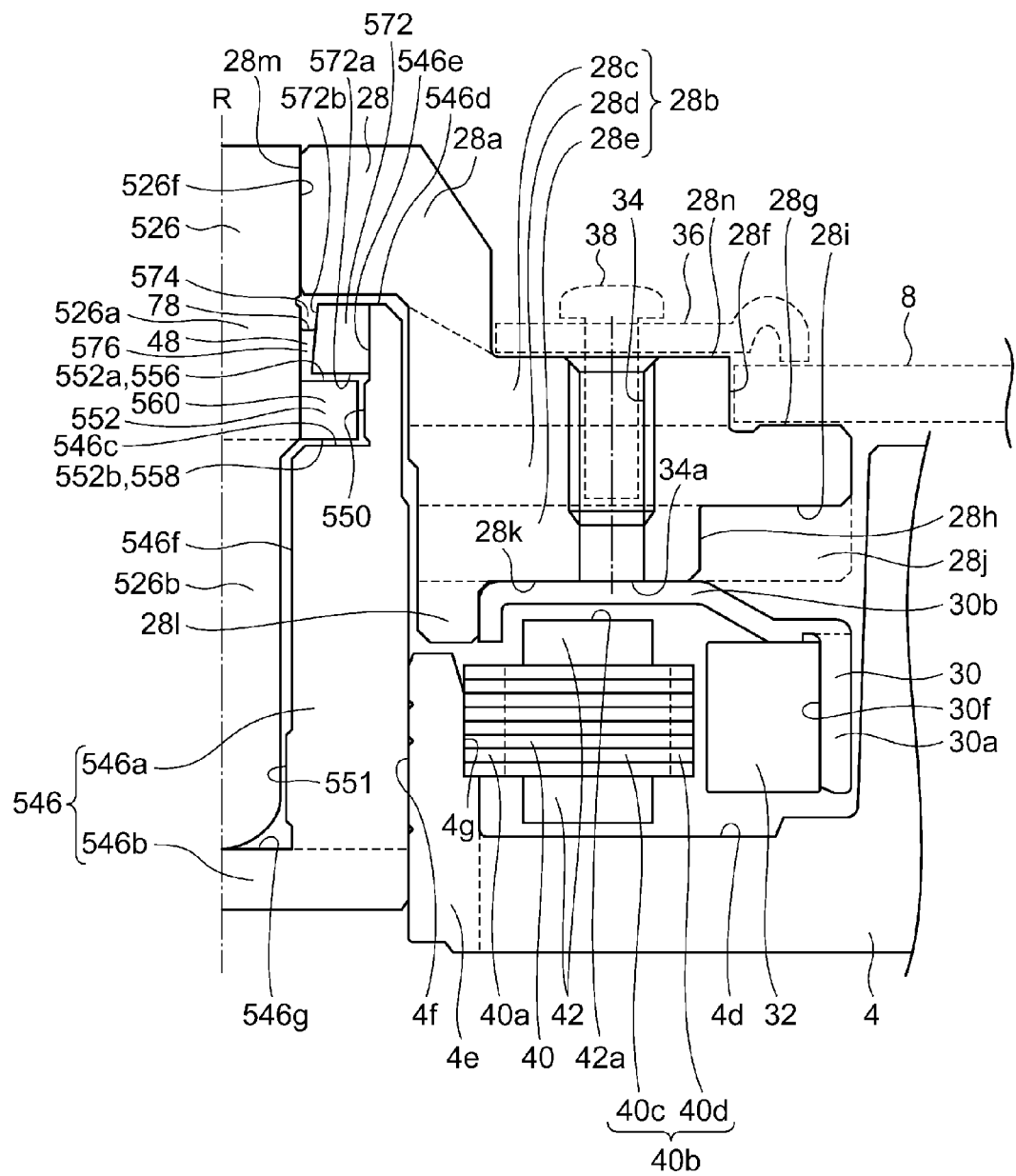
FIG. 8 is a section view of a rotating device according to a fifth embodiment.

FIG. 8 shows a section view of the rotating device 500 according to the fifth embodiment. FIG. 8 corresponds to FIG. 2.

The shaft 526 extends along a rotational axis R. The shaft 526 has a large diameter portion 526a and a small diameter portion 526b formed below the large diameter portion 526a. The upper end of the large diameter portion 526a is fixed to a hole 28m of a hub 28 by a combination of press-fitting and gluing. A flange 552 is press-fitted to the lower end of the large diameter portion 526a.

A sleeve 546 is formed into a shape of a bottomed cup by integrating a cylindrical portion 546a and a bottom portion 546b as a single unit. The sleeve 546 is fixed by gluing to a base 4 with the bottom portion 546b downside. The sleeve 546 accommodates the shaft 526. The cylindrical portion 546a has two upper surfaces: an inner upper surface 546c; and an outer upper surface 546d. The upper surfaces are arranged in said order from the inside in the radial direction. The inner upper surface 546c is located below the outer upper surface 546d. The cylindrical portion 546a has two inner circumferential surfaces: a first inner circumferential surface 546e, which is adjacent to the outer upper surface 546d and the inner upper surface 546c; and a second inner circumferential surface 546f, which is adjacent to the inner upper surface 546c and the upper surface 546g of the bottom portion 546b.

A thrust cap 572 is press-fitted to the upper end side of the first inner circumferential surface 546e. The thrust cap 572 is formed of a predetermined resin material by, for example, metallic molding such as injection molding. A flange space 560 that can accommodate the flange 552 is formed between the lower surface 572a of the thrust cap 572 and the inner upper surface 546c of the cylindrical portion 546a.

A space between a set of the shaft 526 and the flange 552 and the sleeve 546 is filled with the lubricant 48.

A first radial dynamic pressure groove 550 is formed on a first inner circumferential surface 546e of the sleeve 546 at a part that faces the flange 552. A second radial dynamic pressure groove 551 is formed at the lower end of a second inner circumferential surface 546f. In other words, compared to the case of the first embodiment, the first radial dynamic pressure groove 550 is formed at a position that is far away from the rotational axis R. As a result, high radial stiffness can be obtained. A first thrust dynamic pressure groove 556 and a second thrust dynamic pressure groove 558 correspond to the first thrust dynamic pressure groove 56 and the second thrust dynamic pressure groove 58, respectively.

A taper seal 576, where a gap 574 between the inner circumferential surface 572b of the thrust cap 572 and the outer circumferential surface 526f of the large diameter portion 526a of the shaft 526 gradually increases upward, is formed between the thrust cap 572 and the shaft 526. As in the case of the taper seal 476 according to the fourth embodiment, the taper shape of the taper seal 576 is realized only by the inclination of the inner circumferential surface 572b of the thrust cap 572. The thrust cap 572 formed of a resin material may be impregnated with an oil repellent agent.

In the rotating device 500 according to the present embodiment, operations and effects are achieved that are similar to those achieved by the rotating device 1 according to the first embodiment. In addition, in the rotating device 500 according to the present embodiment, the first radial dynamic pressure groove 550 is formed at a position that is relatively far away from the rotational axis R. As a result, higher radial stiffness can be obtained.

In addition, in the rotating device 500 according to the present embodiment, a part of the shaft 526 is formed to have a relatively small diameter. This allows the surface area of the shaft 526 to be reduced. In other words, a contact area of the shaft 526 and the lubricant 48 becomes reduced. Thus, frictional resistance the shaft 526 receives from the lubricant 48 is reduced, and a driving force for rotating the hub 28 and the shaft 526, which rotate while having the recording disk 8 mounted thereon, i.e., a drive current is reduced.

Sixth Embodiment

Main differences between the rotating device 500 according to the fifth embodiment and a rotating device 600 according to a sixth embodiment are the shape of a sleeve and the shape of a flange.

Figure 9:
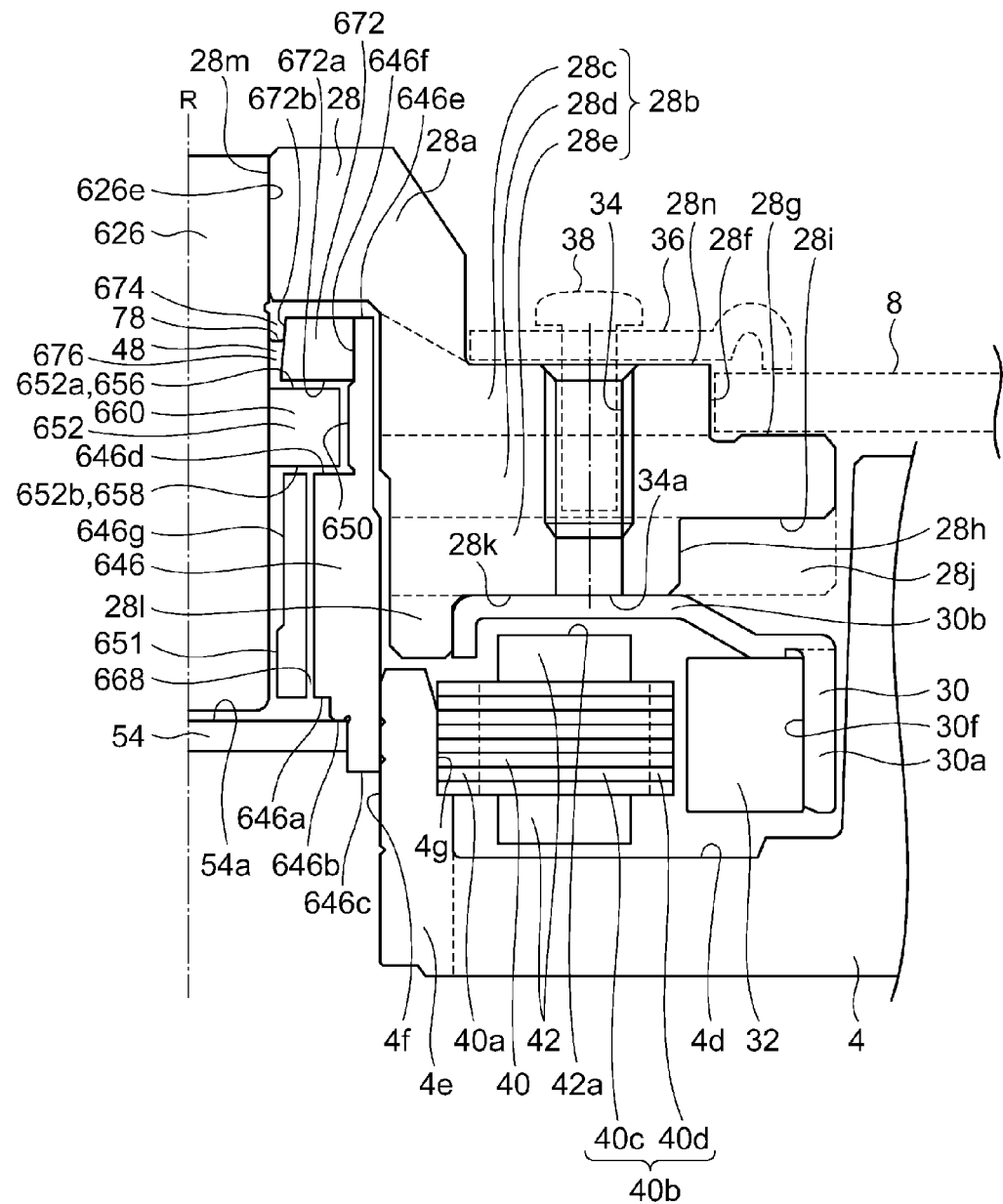
FIG. 9 is a section view of a rotating device according to a sixth embodiment.

FIG. 9 shows a section view of the rotating device 600 according to the sixth embodiment. FIG. 9 corresponds to FIG. 2.

A sleeve 646 is formed into a ring shape. The sleeve 646 has an inner upper surface 646d, an outer upper surface 646e, a first inner circumferential surface 646f, and a second inner circumferential surface 646g, which correspond to the inner upper surface 546c, the outer upper surface 546d, the first inner circumferential surface 546e, and the second inner circumferential surface 546f according to the fifth embodiment, respectively. The sleeve 646 also has an inner lower surface 646a, an intermediate lower surface 646b, and an outer lower surface 646c, which correspond to the inner lower surface 46a, the intermediate lower surface 46b, and the outer lower surface 46c according to the first embodiment, respectively. A plate 54 is fixed with glue to the intermediate lower surface 646b of the sleeve 646.

A thrust cap 672 is press-fitted to the upper end side of the first inner circumferential surface 646f. The thrust cap 672 corresponds to the thrust cap 572 according to the fifth embodiment. A flange space 660 corresponds to the flange space 560 according to the fifth embodiment.

A communication hole 668 is formed in the sleeve 646. The communication hole 668 is formed linearly and penetrates the sleeve 646 in the axial direction from the inner upper surface 646d to the inner lower surface 646a.

A flange 652 is press-fitted to the shaft 626. The flange 652 is formed of a resin material by, for example, metallic molding such as injection molding. The flange 652 is formed such that the thickness thereof in the radial direction and the thickness thereof in the axial direction become larger than those according to the fifth embodiment.

A space between a set of the shaft 626 and the flange 652 and the sleeve 646 is filled with the lubricant 48. The communication hole 668 is also filled with the lubricant 48.

A first radial dynamic pressure groove 650 is formed on a first inner circumferential surface 646f of the sleeve 646 at a part that faces the flange 652. A second radial dynamic pressure groove 651 is formed at the lower end of a second inner circumferential surface 646g. The thickness of the flange 652 in the radial direction is larger than the thickness of the flange 552 according to the fifth embodiment in the radial direction. Thus, the first radial dynamic pressure groove 650 is formed at a position that is farther away from the rotational axis R compared to the first radial dynamic pressure groove 550 according to the fifth embodiment. In accordance with the flange 652, the first radial dynamic pressure groove 650 is formed to be larger in the axial direction than the first radial dynamic pressure groove 550 according to the fifth embodiment. Therefore, the radial stiffness of the bearing can be even further improved compared to that of the fifth embodiment.

A first thrust dynamic pressure groove 656 and a second thrust dynamic pressure groove 658 correspond to the first thrust dynamic pressure groove 556 and the second thrust dynamic pressure groove 558, respectively. In accordance with the flange 652, the first thrust dynamic pressure groove 656 and the second thrust dynamic pressure groove 658 are formed to be larger in the radial direction than the first thrust dynamic pressure groove 556 and the second thrust dynamic pressure groove 558 according to the fifth embodiment, respectively. Therefore, the axial stiffness of the bearing can be further improved compared to that of the fifth embodiment.

The shaft 626 and the sleeve 646 are formed such that the respective lengths of the shaft 626 and the sleeve 646 in the axial direction are shorter than those of the shaft 526 and the sleeve 546 according to the fifth embodiment, respectively. As described above, high radial stiffness and axial stiffness can be obtained. Thus, even when the shaft 626 is shortened, the stiffness of the bearing can be maintained at a relatively high level.

In the rotating device 600 according to the present embodiment, operations and effects are achieved that are similar to those achieved by the rotating device 500 according to the fifth embodiment. In addition, compared to the case of the fifth embodiment, the first radial dynamic pressure groove 650 is formed at a position that is farther away from the rotational axis R by the amount of the increase in the thickness of the flange 652 in the radial direction. The first radial dynamic pressure groove 650 is formed to be larger in the axial direction by the amount of the increase in the axial direction in the thickness of the flange 652. The first thrust dynamic pressure groove 656 and the second thrust dynamic pressure groove 658 are formed to be larger in the radial direction by the amount of the increase in the radial direction in the thickness of the flange 652. Therefore, higher radial stiffness and axial stiffness can be obtained compared to those of the fifth embodiment.

In the rotating device 600 according to the present embodiment, the respective lengths of the shaft 626 and the sleeve 646 can be shortened in the axial direction compared to those of the fifth embodiment. With this, the material costs for the shaft 626 and the sleeve 646 are reduced.

Described above is an explanation for the structure and operation of the rotating devices according to the embodiments. These embodiments are intended to be illustrative only, and it will be obvious to those skilled in the art that various modifications to constituting elements and processes could be developed and that such modifications are also within the scope of the present invention.

In the first through sixth embodiments, an explanation is given regarding a so-called outer-rotor type rotating device in which a cylindrical magnet is located outside a laminated core. However, the present invention is not limited to this. For example, the technical concept of the present embodiments may be applied to a so-called inner-rotor type rotating device in which a cylindrical magnet is located inside a laminated core.

In the first through sixth embodiments, an explanation is given regarding a case where a bearing unit is directly mounted onto a base. However, the present invention is not limited to this. For example, a configuration may be implemented where a brushless motor comprising a hub, a cylindrical magnet, a yoke, a bearing unit, a laminated core, a coil, and a base is separately formed such that the brushless motor is mounted on a chassis.

A case where a laminated core is used is described in the first through sixth embodiments. However, a laminated core does not have to be used as the core.

In the first through sixth embodiments, an explanation is given regarding a case where a base 4 is formed by aluminum die-casting. However, the present invention is not limited to this. For example, a base 4 may be formed of a metal plate, such as an aluminum plate or an iron plate, by press working. In this case, an embossed portion may be provided where one side of the base 4 is pushed up to form a convex area and where a concave area is formed on the other side in correspondence to the convex area. The deformation of the base 4 can be prevented by providing an embossed portion at a predetermined site. In this case, surface treatment such as plating or resin coating may be performed on the base 4. For example, the base 4 may be formed by press-working of an iron plate, and a nickel-plated layer and an epoxy resin surface layer may be then provided.

The base 4 may be formed by combining a sheet metal portion that is formed by press-working of a metal plate such as an aluminum plate or an iron plate and a die-cast portion that is formed by aluminum die-casting. For example, the bottom plate 4a may be configured to include the sheet metal portion, and the outer circumferential wall portion 4b may be configured to include the die-cast portion. With this configuration, a decrease in the stiffness of the screw holes 22 can be prevented. An example of a method for manufacturing such a base 4 includes a method where a die-cast portion is formed by aluminum die-casting of a formed sheet metal portion in a state where the sheet metal portion is set in a metal mold for aluminum die-casting. According to such a manufacturing method, the effort of combining a sheet metal portion and a die-cast portion can be saved, and the dimensional accuracy of the sheet metal portion and the die-cast portion can be improved. Alternatively, a separate member for combining the sheet metal portion and the die-cast portion can be reduced in size or removed, and the base 4 can be formed to be thin as a result.

What is claimed is:

1. A rotating device comprising:
a base;
a hub that is rotatably supported by the base and on which a recording disk is to be mounted;
a yoke that is fixedly provided on the hub and is configured to hold a magnet;
a bearing unit in which one end thereof is fixedly provided on the base and in which the other end thereof is configured to hold the hub; and
a coil that is fixedly provided on the base and is configured to generate electromagnetic interaction with the magnet,
wherein the hub has a screw hole in which a screw for fixing a clamper, which is used to fix the recording disk to the hub, to the hub is screwed,
wherein the screw hole penetrates the hub,
wherein the yoke is configured such that the yoke covers one end of the screw hole,
wherein a thickness reduction portion is provided around the hub on a side opposite in the axial direction to a surface on which the recording disk is to be mounted, and
wherein an inner surface of the thickness reduction portion in the radial direction is located closer to the rotation center compared to a side surface of the hub onto which an inner circumference of the recording disk is fitted.

2. The rotating device according to claim 1 wherein the yoke is interposed between the bearing unit and the hub.

3. The rotating device according to claim 1, wherein the yoke has:
a bearing unit surrounding portion that surrounds said other end of the bearing unit and comes in contact with a side surface of said other end of the bearing unit;
a cover portion that is provided outward of the bearing unit surrounding portion in the radial direction and that covers said one end of the screw hole; and
a magnet holding portion that is provided outward of the cover portion in the radial direction and in which the magnet is fixed.

4. The rotating device according to claim 3, wherein the hub has an annular shape,
wherein the yoke further has a hub contacting portion with which the inner circumferential surface of the hub comes in contact, and
wherein the cover portion comes in contact with the hub in the axial direction.

5. The rotating device according to claim 1, wherein the yoke has an embossed surface that is formed by press working of a metal plate and that has a thickness in a range of 0.2 mm to 1.0 mm.

6. The rotating device according to claim 1, wherein the bearing unit includes a shaft and a sleeve housing one end of the shaft, and
wherein the yoke has a portion that is fixed to the other end of the shaft.

7. The rotating device according to claim 1, wherein the yoke has an extension portion that extends toward the base in an area closer to the rotational axis compared to the coil.

8. A rotating device comprising:
a base;
a hub that is rotatably supported with respect to the base and on which a recording disk is to be mounted;
a bearing unit in which one end thereof is fixedly supported by the base and in which the other end thereof is configured to hold the hub;
a yoke that is fixedly supported by the hub and is configured to hold a magnet; and
a coil that is fixedly supported by the base and is configured to generate electromagnetic interaction with the magnet,
wherein a projection area of the yoke in the axial direction covers a projection area of the coil in the axial direction,
wherein the yoke has a yoke peripheral wall portion that surrounds the magnet, a radial extension portion that extends in the radial direction from a side surface of the yoke peripheral wall portion, and an axial extension portion that extends in the axial direction from the radial extension portion along a side surface of the hub, and
wherein the axial extension portion is located inside the projection area of the coil in the axial direction.

9. The rotating device according to claim 8, wherein the yoke has a portion that is interposed between the bearing unit and the hub.

10. The rotating device according to claim 8,
wherein a thickness reduction portion is provided around the hub on a side opposite in the axial direction to a surface on which the recording disk is to be mounted, and
wherein an inner surface of the thickness reduction portion in the radial direction is located closer to the rotation center compared to a side surface of the hub onto which an inner circumference of the recording disk is fitted.

11. The rotating device according to claim 8,
wherein the yoke has an embossed surface that is formed by press working of a metal plate and that has a thickness in a range of 0.2 mm to 1.0 mm.

12. The rotating device according to claim 8,
wherein the bearing unit includes a shaft and a sleeve housing one end of the shaft, and
wherein the yoke has a portion that is fixed to the other end of the shaft.

13. A rotating device comprising:
a base;
a hub that is rotatably supported by the base and on which a recording disk is to be mounted;
a yoke that is fixedly provided on the hub and is configured to hold a magnet;
a bearing unit in which one end thereof is fixedly provided on the base and in which the other end thereof is configured to hold the hub; and
a coil that is fixedly provided on the base and is configured to generate electromagnetic interaction with the magnet,
wherein the hub has a screw hole in which a screw for fixing a clamper, which is used to fix the recording disk to the hub, to the hub is screwed,
wherein the screw hole penetrates the hub,
wherein the yoke is configured such that the yoke covers one end of the screw hole, and
wherein the yoke has an embossed surface that is formed by press working of a metal plate and that has a thickness in a range of 0.2 mm to 1.0 mm.

14. The rotating device according to claim 13,
wherein the yoke has an extension portion that extends toward the base in an area closer to the rotational axis compared to the coil.

15. The rotating device according to claim 13,
wherein the hub has an protruding portion that protrudes toward the base in an area closer to the rotational axis compared to the coil, and
wherein the yoke is fixed to the protruding portion.

16. The rotating device according to claim 13,
wherein the bearing unit includes a shaft and a sleeve housing one end of the shaft, and
wherein a herringbone-shaped radial dynamic pressure groove is formed on an inner circumferential surface of the sleeve.

17. The rotating device according to claim 1,
wherein the hub has an protruding portion that protrudes toward the base in an area closer to the rotational axis compared to the coil, and
wherein the yoke is fixed to the protruding portion.

18. The rotating device according to claim 1,
wherein the bearing unit includes a shaft and a sleeve housing one end of the shaft, and
wherein a herringbone-shaped radial dynamic pressure groove is formed on an inner circumferential surface of the sleeve.

19. The rotating device according to claim 8,
wherein the hub has an protruding portion that protrudes toward the base in an area closer to the rotational axis compared to the coil, and
wherein the yoke is fixed to the protruding portion.

20. The rotating device according to claim 8,
wherein the bearing unit includes a shaft and a sleeve housing one end of the shaft, and
wherein a herringbone-shaped radial dynamic pressure groove is formed on an inner circumferential surface of the sleeve.

\* \* \* \* \*